United States Patent [19]

Sixsmith

[11] Patent Number: 5,279,379
[45] Date of Patent: Jan. 18, 1994

[54] COMPACT, COUPLED PROPULSION AND LIFT UNIT FOR HOVERCRAFT

[75] Inventor: Richard A. Sixsmith, Mississauga, Canada

[73] Assignee: Plasticair Inc., Mississauga, Canada

[21] Appl. No.: 717,037

[22] Filed: Jun. 18, 1991

[51] Int. Cl.$^5$ .............................. B60V 1/14; B60V 1/16
[52] U.S. Cl. ...................................... 180/117; 180/127
[58] Field of Search ............... 180/116, 117, 118, 119, 180/120, 121, 122, 123, 124, 125, 126, 127, 128, 129, 130; 244/12.3, 12.5, 23 B, 23 D, 51, 52; 416/178, 124, 125, 126; 415/62

[56] References Cited

U.S. PATENT DOCUMENTS

| | | | |
|---|---|---|---|
| 742,522 | 10/1903 | Timayenis | 416/178 X |
| 902,533 | 10/1908 | Hubbard | 416/178 X |
| 2,740,616 | 4/1956 | Walden . | |
| 3,387,685 | 6/1968 | Fresh et al. | 180/127 X |
| 3,468,394 | 9/1969 | Winter . | |
| 3,468,395 | 9/1969 | Winter . | |
| 3,532,129 | 10/1970 | Ward et al. . | |
| 3,548,968 | 12/1970 | Aronson . | |
| 3,662,852 | 5/1972 | Taylor . | |
| 3,836,097 | 9/1974 | Korth . | |
| 3,860,084 | 1/1975 | Bingham . | |
| 3,968,851 | 7/1976 | Windt | 180/117 |
| 4,249,628 | 2/1981 | Longley . | |
| 4,258,823 | 3/1981 | Ganz et al. . | |
| 4,369,853 | 1/1983 | Heijola et al. . | |
| 4,397,367 | 8/1983 | Ivanov et al. . | |

FOREIGN PATENT DOCUMENTS

| | | | |
|---|---|---|---|
| 0587408 | 11/1959 | Canada | 416/178 |
| 943582 | 3/1974 | Canada . | |
| 967200 | 5/1975 | Canada . | |
| 0237606 | 4/1973 | U.S.S.R. | 180/117 |

*Primary Examiner*—Margaret A. Focarino
*Assistant Examiner*—Florian Zeender
*Attorney, Agent, or Firm*—Barry Kramer

[57] ABSTRACT

A combined propulsion and lift unit for an air-cushion vehicle is provided comprising an elongate shaft mounted for rotation about its central longitudinal axis, bearings for rotatably supporting the shaft, an axial wheel with two or more blades mounted on the shaft for rotation therewith, a first housing extending peripherally about the shaft, the housing provided with an air inlet and an air outlet, a drive device connected to the shaft for rotating same at a selected speed, a centrifugal fan wheel mounted on the shaft for rotation therewith, the fan wheel provided with an air inlet, the fan wheel located inside the first housing, and a second housing extending about the perimeter of the axial wheel and the first housing, the second housing having a larger diameter than the first housing thereby defining an air passageway therebetween, the second housing provided with an air inlet and an air outlet.

32 Claims, 8 Drawing Sheets fig 1 fig 2 fig 3 fig 4 fig 5 fig 8 fig 9 fig 10 fig 11 fig 12 fig 13 fig 14

COMPACT, COUPLED PROPULSION AND LIFT UNIT FOR HOVERCRAFT

FIELD OF THE INVENTION

This invention relates to devices for propelling and lifting an air-cushion vehicle.

BACKGROUND OF THE INVENTION

Air-cushion vehicles, also known as hovercraft, have been known for quite some time. These vehicles have a hull that has a skirt extending about its perimeter. Motorized fan units ar used to produce a cushion of high pressure air under the vehicle so as to lift it off the ground. The vehicle is then usually driven or propelled over the ground by means of an axial wheel or propeller or more than one propeller.

U.S. Pat. No. 3,662,852 which issued May 16, 1972, to R.V. Taylor describes an air-cushion vehicle wherein the hull has a peripheral bag skirt extending downwardly therefrom. Near the centre of the vehicle is a single engine which provides power to a centrifugal cushion fan for supplying cushion air. Mounted at the rear of the vehicle is an air screw or propeller for supplying thrust to the vehicle. Power is provided to the air screw by means of the same engine acting through a drive shaft, pulleys and one or more drive belts extending about these pulleys.

More recent U.S. Pat. No. 3,860,084 issued Jan. 14, 1975 to Vosper Thornycroft Limited describes an air cushion vehicle which has a propulsion fan or propeller in a fan duct mounted at the rear of a vehicle and inclined at an angle to the horizontal. A long drive shaft extends forwardly from the propeller at the aforementioned angle to the horizontal to a gear box. Power is provided to this gear box through an output shaft connected to a power plant. By means to a suitable gear arrangement, the same power plant is used to drive two sets of centrifugal lift fans mounted forwardly of the gear box.

SUMMARY OF THE INVENTION

The subject invention provides a compact and combined propulsion and lift unit for an air-cushion vehicle which is relatively simple to construct and which can be made at a reasonable cost. According to one aspect of the invention, both an axial wheel propeller that provides propulsion and a centrifugal fan wheel that provides the high pressure lift air are connected to the same elongate shaft for rotation therewith, wherein the shaft is mounted substantially within a first housing. With this arrangement, it is possible to have a single power source or driving device for the combined propulsion and lift unit.

According to another aspect of the invention, a combined propulsion lift unit for a hovercraft comprises an elongate shaft mounted for rotation about its central longitudinal axis, bearing means for rotatably supporting the shaft, and means connected to the shaft for rotating same at selected speed. An axial wheel with two or more blades is mounted on the shaft for rotation therewith while a centrifugal fan wheel is mounted on one end of the shaft for rotation therewith. The fan wheel has an air inlet on one side thereof and is substantially closed off at the opposite side thereof. There is also a housing extending about the perimeter of the centrifugal fan wheel and having an air inlet and an air outlet.

Preferably there are means for rotating this propulsion and lift unit about a vertical axis extending perpendicular to the central axis of the shaft.

According to another aspect of the invention, a combined propulsion and lift unit for an air-cushioned vehicle includes an elongate shaft mounted on bearings for rotation about its central longitudinal axis. There is means connected to the shaft for rotating same at a selected speed. The unit is provided with an axial wheel having two or more blades, the axial wheel being mounted on the shaft for rotation therewith. A centrifugal fan wheel is mounted on one end of the shaft for rotation therewith and is provided with a housing extending about the perimeter of the centrifugal fan and having an axial inlet at the front end thereof and an outlet for high pressure air arranged on one side thereof.

In this aspect of the invention, the unit is provided with an unit housing enclosing the combined propulsion and lift unit which extends about the perimeter of the axial wheel and the fan housing and which has an inlet and an air outlet.

In this same aspect of the invention, the housing axial inlet protrudes forwardly of the unit housing.

In yet another aspect of the invention, a combined propulsion and lift unit for an air-cushion vehicle includes an elongate shaft mounted on bearing means for rotation about its central longitudinal axis. An axial wheel with two or more blades is mounted on the shaft for rotation therewith. A centrifugal fan wheel is mounted on the shaft for rotation therewith and is enclosed in a centrifugal fan housing. The fan wheel has an air inlet on one side thereof and is substantially closed off at the opposite side thereof. The centrifugal fan housing has an air inlet and an air outlet. There is means connected to the shaft for rotating same at a selected speed. A second housing extends about the perimeter of the axial wheel and the centrifugal fan housing. The second housing has a larger inner dimension than the outer dimension of the centrifugal fan housing, thereby defining an air passageway therebetween. The second housing is provided with an air inlet and an air outlet. The air passageway has an opening permitting air-flow to the centrifugal fan housing air inlet.

In still another aspect of the invention, a method of combining a propulsion and lift system for use in an air-cushion vehicle includes mounting an axial thrust fan and a centrifugal lift fan on a rotatable shaft, enclosing the lift fan inside an axial fan bearing tube, wherein the bearing tube is provided with an air inlet and an air outlet. The axial fan and the bearing tube are mounted inside a housing so that some of the air which is drawn into an air passageway located between the housing and the bearing tube is supplied to the centrifugal fan by the axial fan when the shaft is rotating.

In a further aspect of the invention, there is provided a hovercraft which includes a hull with a deck structure and a skirt for enclosing an air-cushion extending about the hull and connected thereto. Two combined propulsion and lift units are included which are rotatably mounted on a rear section of the deck structure and located o opposite sides of a longitudinal centre line of the hull. Each of the units includes a housing having an air inlet and an air outlet, an elongate shaft mounted substantially therein for rotation about its longitudinal axis, bearing means for rotatably supporting the shaft, and a bearing tube through which the shaft extends. The bearing tube is provided with an air inlet and an air outlet. Provided is a means for rotating the shaft at a selected speed. An axial wheel with two or more blades is mounted on the shaft for rotation therewith. A centrifugal fan wheel is mounted on the shaft for rotation therewith and is located inside the bearing tube. This fan wheel has an air inlet on one side and is substantially closed off at the opposite side thereof. An air passageway is provided between the housing and the bearing tube, the air passageway having an opening permitting air-flow to the bearing tube air inlet.

In another aspect of the invention, a hovercraft is provided having a hull with a deck structure and a skirt for enclosing an air-cushion extending about the hull and connected thereto. Two combined propulsion and lift units are provided which are rotatably mounted on a rear section of said deck structure, the units being located on opposite sides of a longitudinal centre line of the hull. Each of the units includes a housing having an air intake and an air outlet. An elongate shaft is mounted substantially within the housing for rotation about its longitudinal axis and bearing means are provided for rotatably supporting the shaft. Means connected to the shaft for rotating same at a selected speed is provided. An axial wheel with two or more blades mounted on the shaft for rotation therewith is included. In addition a centrifugal fan wheel is mounted on the shaft for rotation therewith and is located inside a centrifugal fan housing. The centrifugal fan housing has an air inlet and an air outlet, the air outlet located on one side thereof. The unit is provided with an air passageway located between the bearing tube and the housing, wherein the air passageway is in air-flow communication with the bearing tube air inlet.

BRIEF DESCRIPTION OF THE DRAWINGS

Preferred and alternative embodiments of the invention will now be described, by way of example only, with reference to the accompanying drawings, in which.

DETAILED DESCRIPTION OF THE PREFERRED EMBODIMENTS

Figure 4:
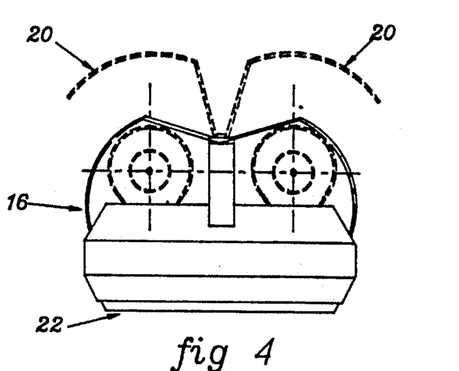
FIG. 4 is a front view of the air-cushion vehicle of FIG. 1.

An air-cushion vehicle 10, also commonly referred to as a "hovercraft", is equipped with a steel hull 12 which may be of standard construction except as explained hereinafter Mounted on hull 12 is a deck structure 14 which can include a cabin enclosure 16 if desired. Mounted in illustrated cabin 16 are two forward seats and two rear seats 18. Access to cabin enclosure 16 is gained by means of two gull wing doors 20 shown in FIG. 4.

As with most hovercraft, vehicle 10 is provided with a flexible skirt 22 for enclosing an air-cushion, which skirt extends about hull 12 and is connected thereto.

Above the rear of craft 10 are mounted two Combined propulsion and lift units 24 of similar construction which provide both a means for propelling the craft along the water and a means for providing air under pressure for the air-cushion on which the craft floats.

Figure 5:
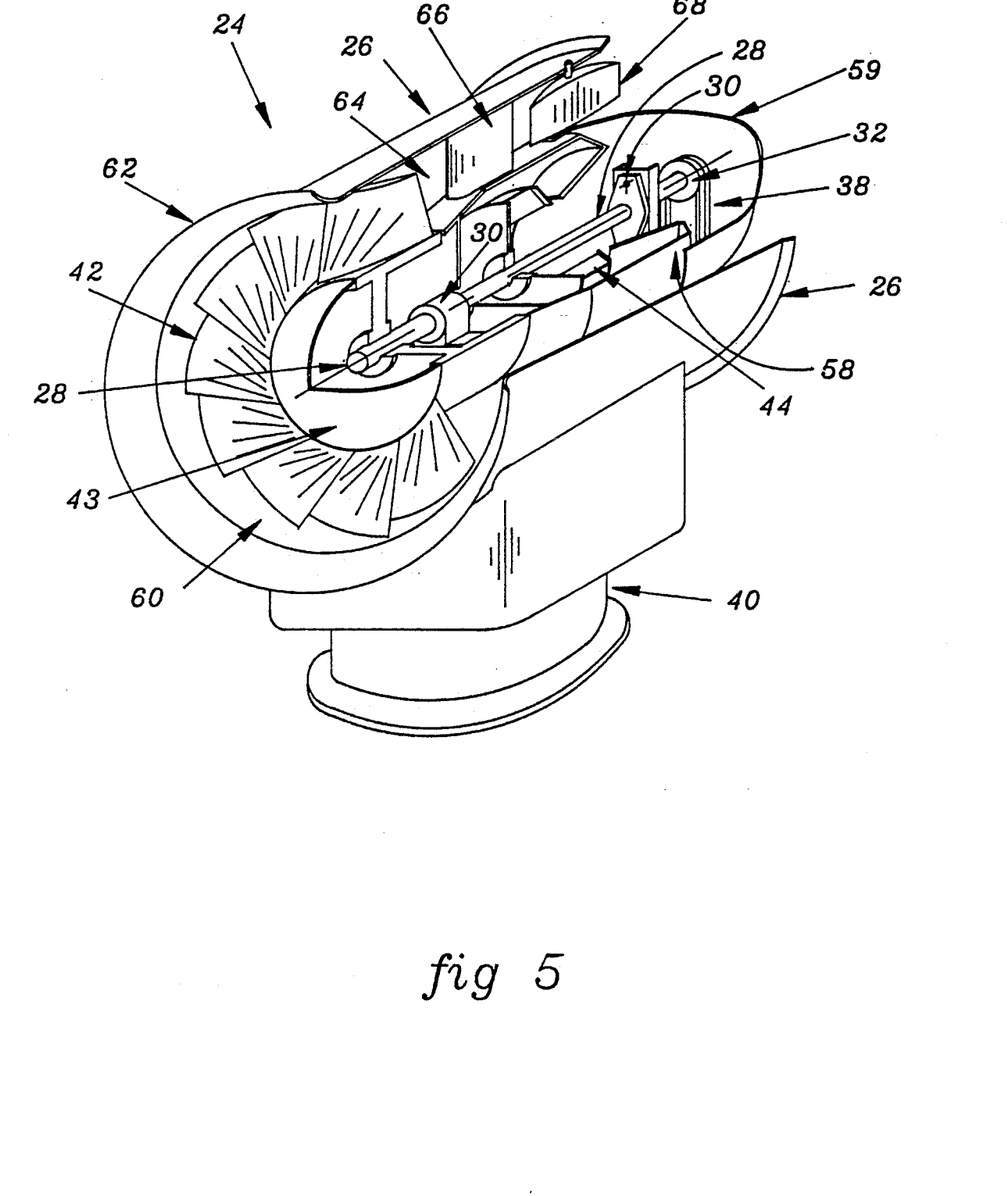
FIG. 5 is a perspective view, broken away, of the combined propulsion and lift system.
Figure 6:
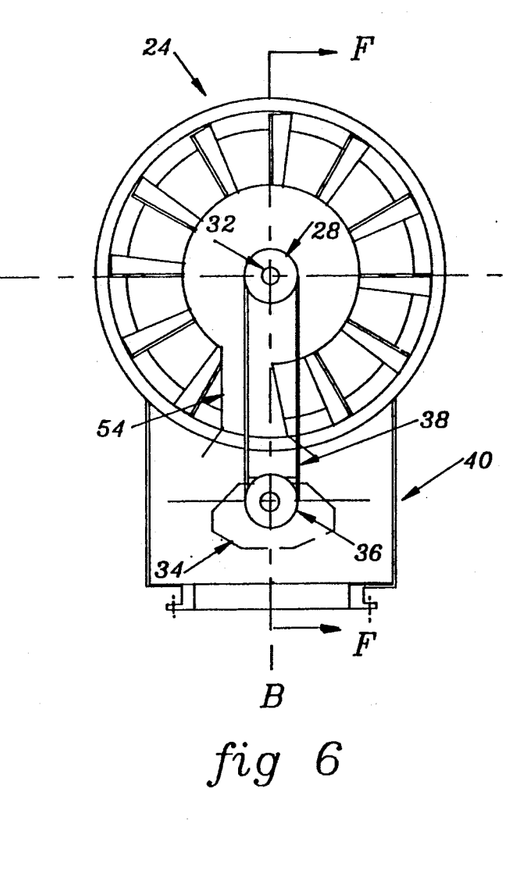
FIG. 6 is a vertical sectional rear view of the combined propulsion and lift unit.
Figure 7:
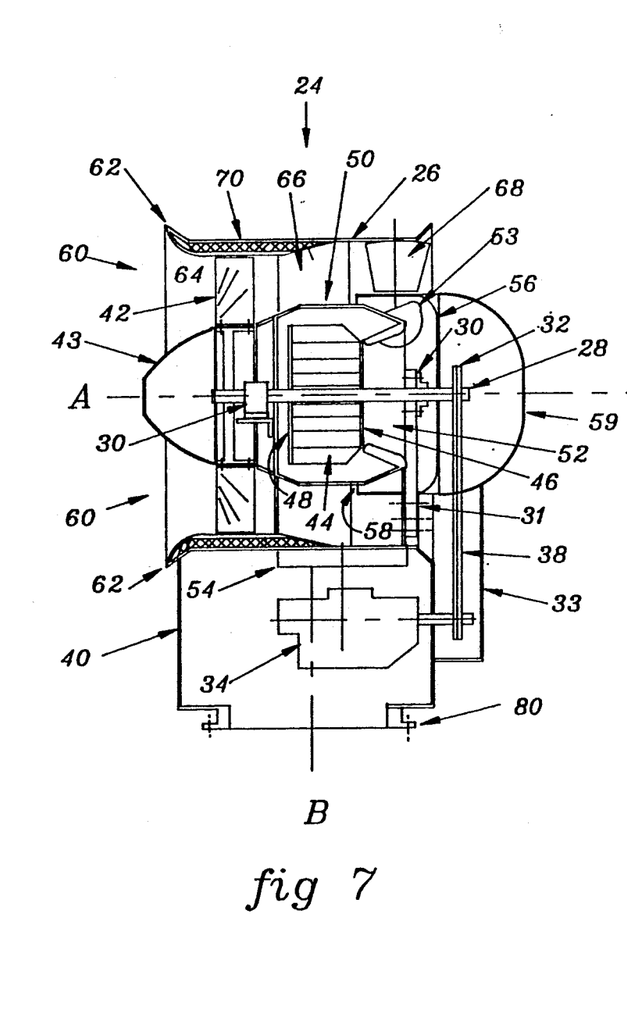
FIG. 7 is a cross-sectional elevation taken along the lines 7—7 of FIG. 6.

The structure and operation of several embodiments of the combined propulsion and lift units 24 of the subject invention will now be described with reference to FIGS. 5-8. Referring first to FIGS. 5-7, the unit 24 is enclosed in a housing 26 and includes an elongate drive shaft 28 mounted for rotation about its central longitudinal axis shown at A. Two spaced bearing units 30 of standard construction are used to rotatably support shaft 28, with bearing, 30 mounted near the rear end of shaft 28 provided with a support 31. Bearings 30 are mounted in what is normally referred to as a bearing tube shown generally at 50, but which is modified in the present invention in a manner and for reasons to be discussed presently. A pulley 32 is mounted adjacent the rear end of shaft 28. A downward extension 40 of housing 26 provides sole support for the propulsion and lift unit 24 which can be rotated about vertical axis B by mean of a slew ring assembly to be described presently. A drive motor 34 is mounted below shaft 28 in portion 40 of housing 26 and is provided with a pulley 36. Motor 34 drives shaft 28 via one or two drive belts 38 connected between pulleys 32 and 34.

An axial wheel fan or propeller 42 is mounted at the front end of shaft 28 for rotation therewith. Propeller 42 is provided with a central hub portion 43 to which the blades are attached. A centrifugal fan (impeller) wheel 44 of known design is mounted in substantially the middle portion of shaft 28 between bearing units 30. Impeller 44 is provided with a central axial opening or air inlet 46 on one side while the other side 48 is closed except for a central axial hole therethrough for shaft 28. Centrifugal fan wheel 44 is mounted within bearing tube 50, wherein tube 50 has been modified to accommodate fan wheel 44. The tube 50 can also be termed an axial fan bearing tube. Specifically, while in conventional designs, a bearing tube such as that shown at 50 would be a cylindrical tube of constant diameter, tube 50 of the present embodiment is provided with a flared portion in order to accommodate a wheel 44 having known dimensions to be properly matched to axial wheel 42. Hereinafter tube and housing may be used interchangeably to describe tube 50.

Bearing tube 50 is provided with a central axial opening shown at 52 at the rear end thereof while the end is closed except for a central axial opening through which shaft 28 passes. Opening 52 provides an air inlet for centrifugal fan wheel 44. A plurality of air guide vanes 53 are rigidly secured circumferentially around the peripheral edge portion of axial fan inlet 52. A plurality of circumferentially disposed support struts are located around the outside of housing 50 extending between housing 50 and housing 26.

Tube or housing 50 is provided with a high pressure outlet duct 54 arranged on the lower portion thereof and extending downwardly and opening into section 40. A cylindrically shaped lift fan cover 56, Closed at one end and opened at the other is mounted over inlet 52 with the peripheral edge of cover 56 adjacent the open end thereof extending around the circumferential edge of fan housing 50. The peripheral edge of cover 56 is spaced from fan housing 50 thereby forming a circumferential gap 58. A thrust Cover 59 is mounted at the rear of unit 24 for covering rotating shaft 28 and pulley 32 while a belt guard 33 provides similar covering for the rotating shaft of motor 34.

Housing 26 is provided with an air inlet 60 wherein housing 26 has a flared end portion 62 to provide improved inlet flow characteristics. Housing 26 includes an annular air-flow passage 64 therethrough. A plurality of curved vanes 66 are circumferentially disposed in passage 64, being rigidly secured between the outer surface of fan housing 50 and the inner wall of housing 26. A plurality of damper vanes 68 are pivotally mounted in passage 64 at the rear end thereof being circumferentially disposed between the outer edges of fan cover 56 and the inner wall of housing 26. There are a sufficient number of vanes 68 so that in the closed position, vanes 68 overlap with the vane adjacent thereto. Preferably when vanes 68 are in the fully closed position there Will exist an air gap between adjacent vanes so that annular passageway 64 is not closed off entirely.

In order to reduce the volume of sound created by propulsion unit 24, sound insulation material can be provided at 70 on housing 26. This material extends on either side of axial wheel 42 and terminates at the rear end of the casing and may be located on the interior of housing 26.

Figure 1:
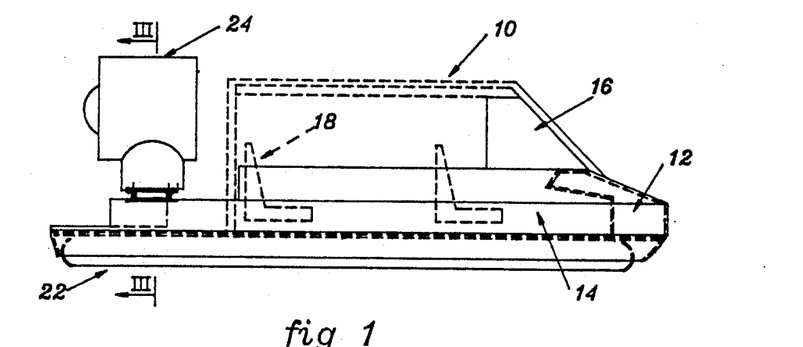
FIG. 1 is a side elevation of an air-cushion vehicle constructed in accordance with the invention.
Figure 2:
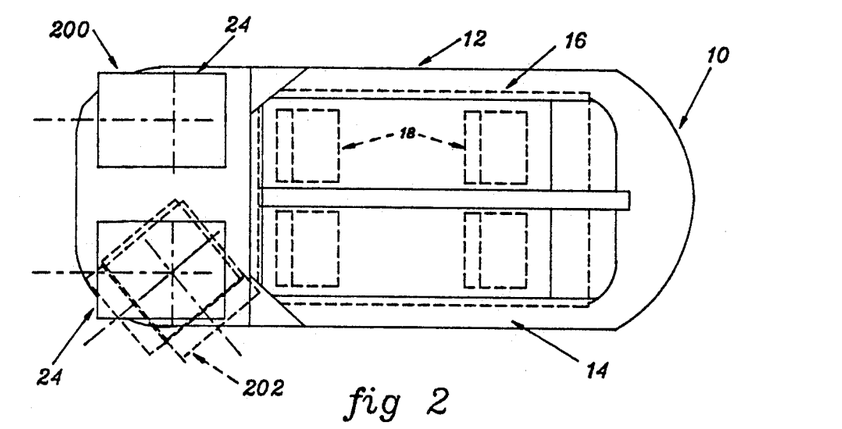
FIG. 2 is a plan view of the air-cushion vehicle of FIG. 1.
Figure 3:
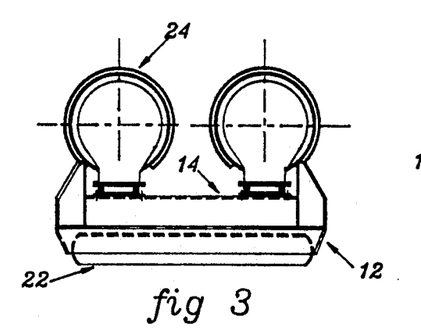
FIG. 3 is a cross-sectional elevation taken along the line III—III of FIG. 1 and taken through the vertical axis to rotation of the propulsion and lift units.
Figure 8:
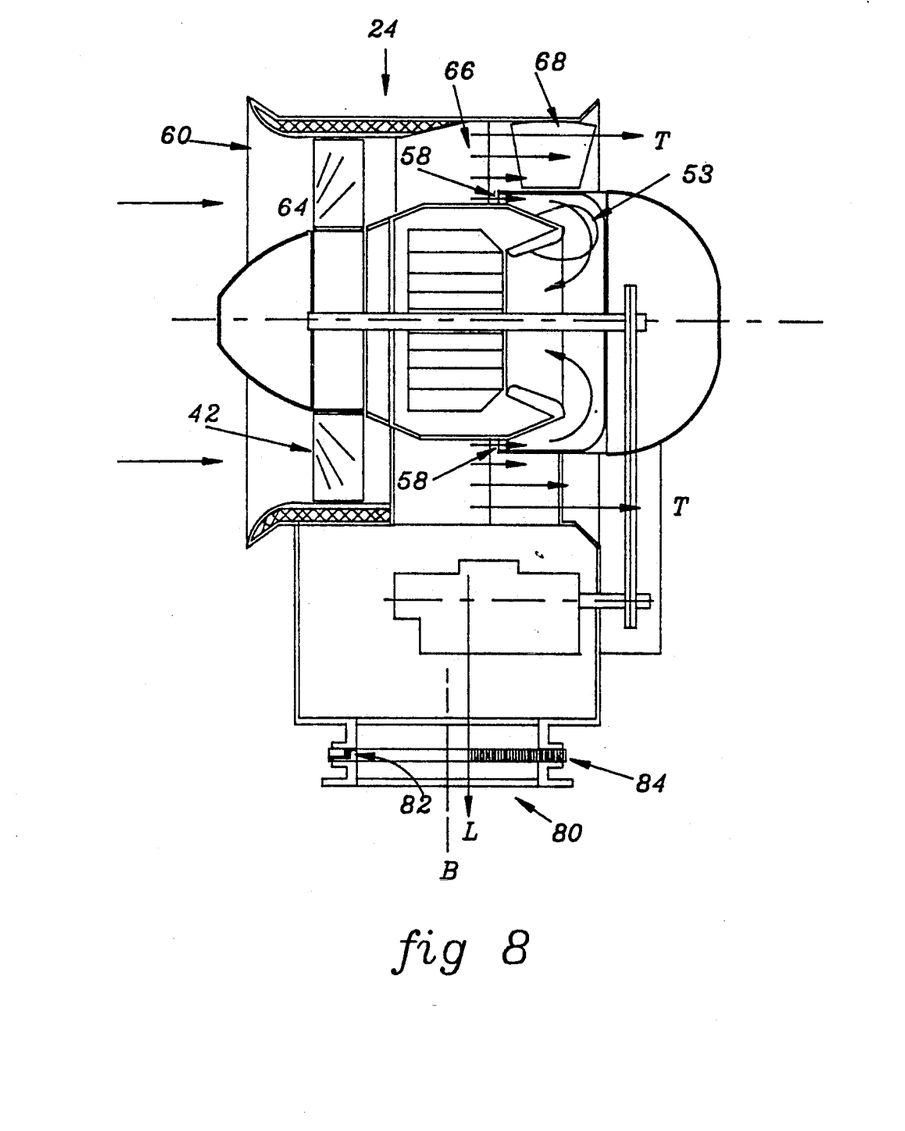
FIG. 8 is a cross-sectional elevational view similar to FIG. 7 but showing the air-flow pattern he propulsion and lift unit.

With reference to FIG. 8, propulsion and lift unit 24 is provided With means for rotating the unit about vertical axis B which extends perpendicular to the central axis A of shaft 28. By providing this rotation means, hovercraft 10 can be steered using one or more of these units as illustrated in FIG. 2. The preferred rotation means includes a slew ring apparatus shown generally at 80. This apparatus includes a stationary inner ring 82 and an outer ring 84 which is rotatable relative to inner ring 82. Slewing rings are large-size bearings designed to accommodate oscillating movements. The high pressure air-flow from aforementioned high pressure outlet 54 flows through the central portion of inner ring 82. It will be understood that this outlet is connected to any suitable plenum arrangement in the hull of hovercraft 10 for distributing the high pressure air throughout the breadth and length of the area enclosed by skirt 22. The slew ring itself is of standard, known construction as such devices are commonly used in other applications. Preferably the slew ring selected should be of a lightweight construction employing steel rings with relatively thin walls. Suitable slewing rings are available from the RKS Company of the SKF Group. Slewing ring apparatus 80 is provided with external gear teeth on rotating outer ring 84. Any suitable gear or pinion operated by a suitable electric motor mounted on the deck of craft 10 may be used to engage the external teeth of outer slew ring 84 and to rotate same as required in order to steer or slow down Craft 10.

In operation, propeller shaft 28 is rotated by motor 34 at the desired speed thereby rotating axial propeller 42 and centrifugal fan wheel 44 together. Referring again to FIG. 8, the air flow streams through the combined propulsion and lift unit 24 are shown which provide both thrust and lift. Air is drawn into passage 64 through inlet 60 by axial propeller 42 and the resulting air flow, coming off the blades of propeller 42 at an angle, is straightened by fixed vanes 66. Some of the air flowing through passage 60 passes through gap 58 whereupon the air flow is rotated by guide vanes 53 into fan inlet 46 and into tube 50. Preferably, gap 58 is positioned so as to be in the vicinity of the point of maximum velocity of the air stream. The resulting high pressure air stream produced by centrifugal fan 44 exits housing 50 through vent or duct 54 to provide the lift (L) or air cushion on which hovercraft 10 floats. With vanes 68 in the closed or near closed position most of the air drawn into passage 60 is directed into fan housing 50 through gap 58 thereby increasing the lift substantially above that achievable with just the centrifugal fan 44. In this way the propulsion and lift system can be coupled. As vanes 68 are rotated open the thrust (T) of axial propeller increases thereby propelling hovercraft 10.

Figure 9:
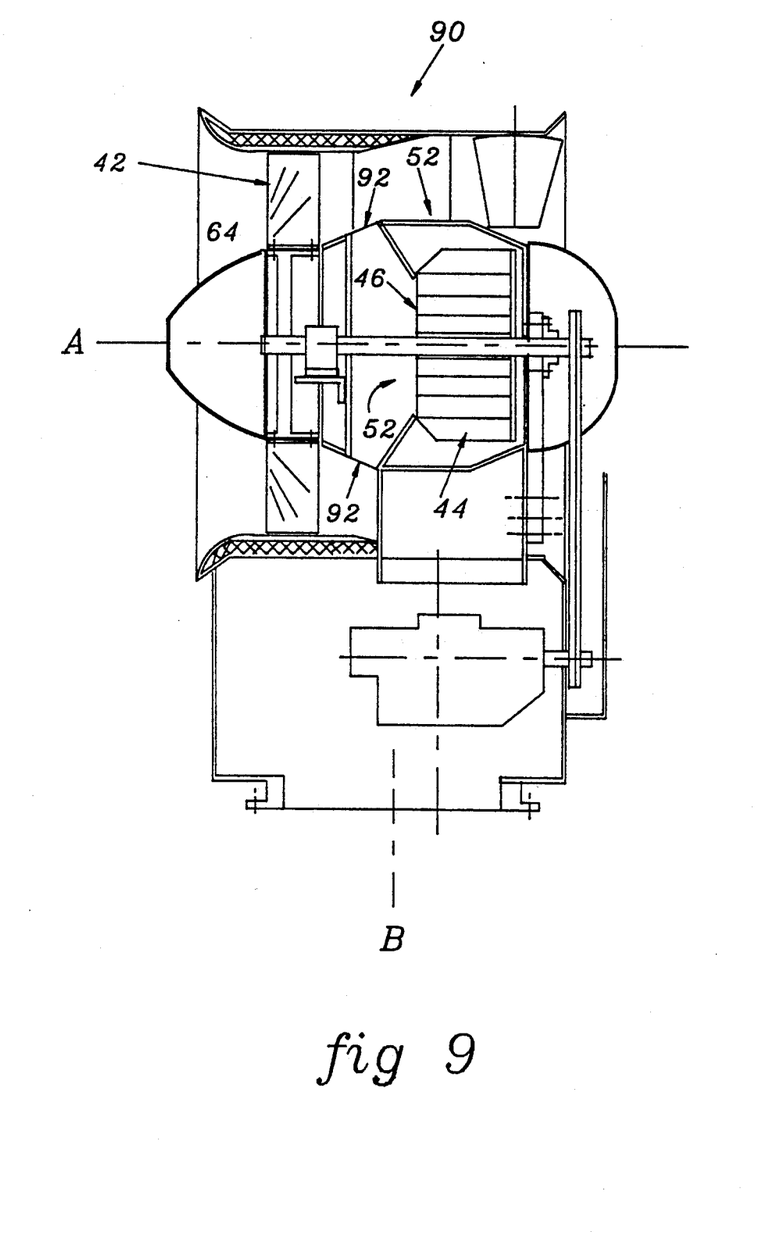
FIG. 9 is a vertical sectional view of an alternative embodiment of the combined propulsion and lift unit of the subject invention.

Referring to FIG. 9, another embodiment of a propulsion unit of the present invention is shown at 90. Unit 90 is similar to unit 24 but with the following differences. In unit 90, centrifugal lift fan 44' and housing 50' have been rotated 180 degrees about the vertical so that central opening 46' of fan 44' and centrifugal fan inlet 52' (now located at the rear of housing 50') open in the opposite direction to that of fan 44 and opening 52 in unit 24. Housing 50' is provided with an annular air inlet 92 extending between passage 64' and the interior of housing 50'.

In operation, propulsion and lift unit 90 works in essentially the same way as unit 24 except that air drawn into passage 60 by propeller 42' enters housing 50' via passages 92. Propeller 42' and fan 44' combine in essentially the same way as in unit 24 to provide lift to the hovercraft much greater than is possible with lift fan 44' alone.

Figure 10:
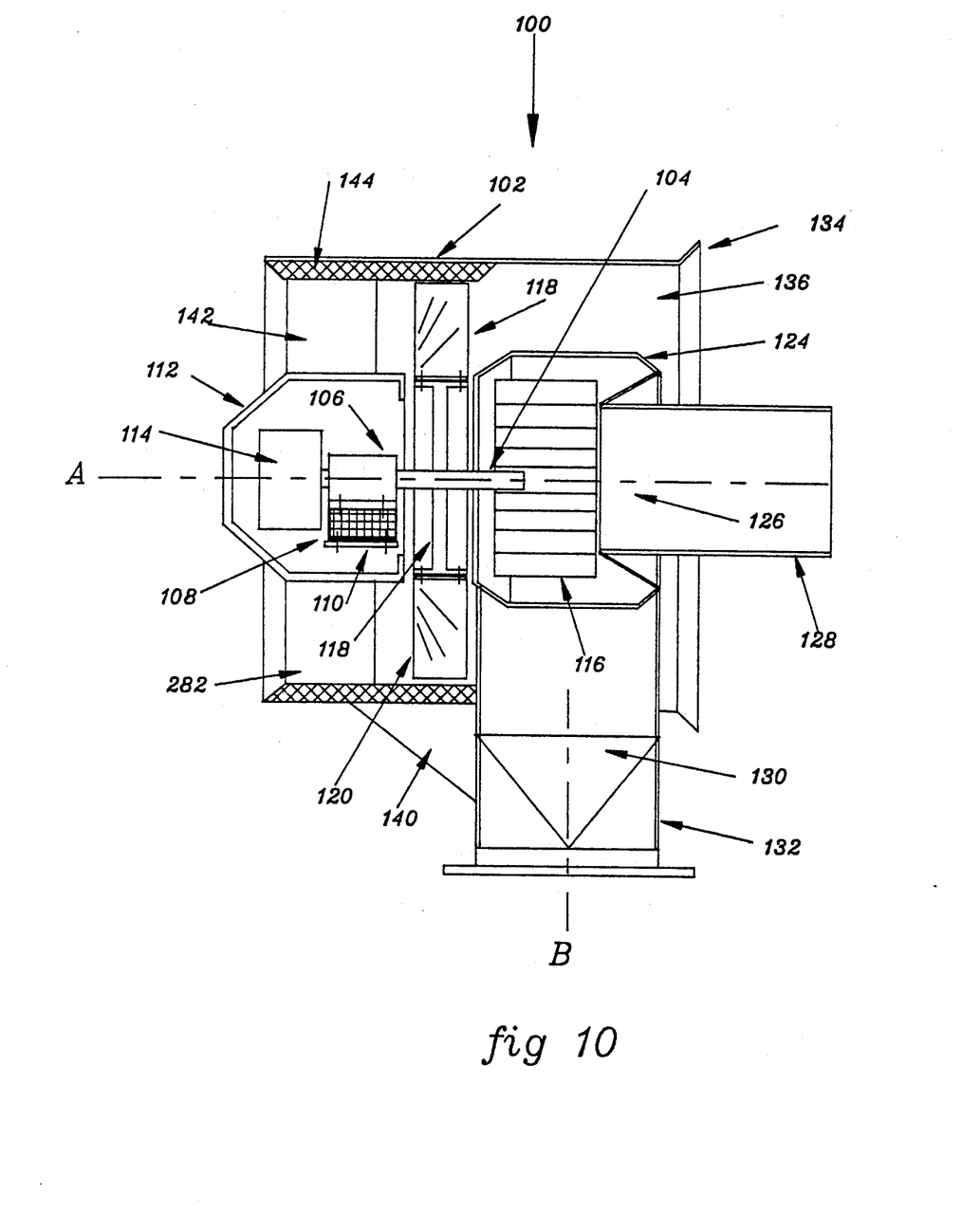
FIG. 10 is a vertical sectional view to yet another alternative embodiment of the propulsion and lift unit.

Another version of a combined propulsion and lift unit constructed in accordance with the present invention is shown in FIG. 10. This unit shown generally at 100 includes an upper housing 102 containing an elongate shaft 104 which is mounted for rotation about its longitudinal axis. Shaft 104 is firmly supported by means of suitable bearings 106 which are mounted on a vibration pad 108 located on top of a support plate 110. Plate 110 is rigidly mounted in a motor enclosure 112. A motor 114 is operatively coupled to shaft 104 for rotating same at a desired speed. Motor 114 is preferably a hydraulic motor which per se is of known construction. The weight of motor 114 is supported by bearings 106 and support plate 110. Motor 114 is also rigidly secured to enclosure 112 so that it is prevented from rotating during operation thereof. A centrifugal fan wheel 116 is mounted on a forward end portion of shaft 104 for rotation therewith. An axial propeller or wheel 118 with two or more air engaging blades 120 is also mounted on shaft 104 rearwardly of fan wheel 116 for rotation therewith. Axial wheel 118 includes a central hub portion 122 to which propeller blades 120 are attached.

A bearing tube 124 is included and extends about the perimeter of fan wheel 116 and is provided with an axial air inlet 126, thereby forming a fan housing. A cylindrical tube member 128 is attached to inlet 126 and extends outwardly therefrom. Tube 128 may be rigidly attached to housing 124 or alternatively may be formed therewith as one unit. Housing 124 includes an air outlet 130 arranged on the bottom side thereof. A downward extension 132 of housing 102 provides sole support for the propulsion and lift unit 100 which can be rotated about vertical axis B by means of a slew ring assembly similar to that described above.

Housing 102 is provided with a front flange 134 which extends circumferentially about both the fan housing 124 and axial wheel 118. Housing 102 is open at both the front and rear end while having no openings about the circumferential perimeter other than the opening for aforementioned outlet 130 for fan wheel 116. Thus housing 102 forms an axial air intake 136 for axial wheel 118, which inlet extends in an annular fashion about axial inlet 126 located in centrifugal fan housing 124. Housing 102 and extension 132 rotate with fan wheel 116 and axial wheel 118 about vertical axis B by means of a slewing ring assembly (not shown) similar to the slewing assemblies described above. One or more rearwardly extending braces 140 are positioned at the bottom of housing 102 between the latter and section 132 to provide support.

Propulsion unit 100 includes a plurality of fixed air guide vanes 142 fixedly mounted rearwardly of axial wheel 118 and there are provided support means for supporting both outer and inner ends of these vanes. As illustrated the outer ends of vanes 142 can be connected to housing 102 while the inner ends are secured to the circumferential portion of motor enclosure 112. Fixed guide vanes 142 act to improve the directional flow of the air rearwardly from axial wheel 118.

In order to reduce the volume of sound created by propulsion unit 100, sound insulation material can be provided at 144 on housing 102. This material commences at the front of axial wheel 118 and terminates at the rear end of housing 102 and may be located on the interior of housing 102.

In operation, propeller wheel 118 draws air into both annular passageway 136 and axial inlet 126 through tube 128. The air drawn into housing 124 is expelled through high pressure vent 130 where it is dispersed by the aforementioned plenum device for providing uniform lift to craft 10. The air-stream drawn into passageway 136 passes through vanes 142 where it is straightened after being drawn through propeller 118 to exit from unit 100 thereby providing thrust to the hovercraft.

By combining a propeller fan wheel and a centrifugal fan wheel in the same housing and on the same drive shaft a illustrated in the aforementioned embodiments, the best qualities of both fan wheels can be provided in a relatively compact unit which is particularly suitable for small to medium sized hovercraft. The ability of the combined propulsion and lift unit of the present invention to provide high pressure, low volume air in one direction and high volume, low pressure air at 90 degrees to the first air flow is ideal for hovercraft use.

It will be understood by those skilled in the art that While the centrifugal fan has essentially been placed within the bearing tube of the axial wheel and provided with a air inlet and air outlet in the embodiments disclosed herein, other possibilities exist. For example, if larger axial fans are used, then while larger centrifugal fans are necessary in order to give the same effect, the centrifugal fan does not have to grow at the same rate as the axial fan. Thus, there will be more room available in housing 26 (FIG. 7) to use a true centrifugal fan housing known in the art as having an involute shape.

Not only can the unit of the present invention be used to propel and lift the hovercraft, as illustrated in FIG. 2, it can also be used to steer and even slow down or stop the hovercraft. From the normal propulsion position shown at 200 in FIG. 2, the unit can be rotated about the vertical axis B as much as 135 degrees to the position indicated in dash lines at 202. It will be appreciated that in the position of maximum rotation indicated in dash lines at 202, the unit will provide a forwardly directed thrust, thus helping to slow the craft. The direction of movement of the craft will not be affected if both units 24 are rotated to the same degree in opposite directions. Thus if both of the units 24 are rotated about their vertical axis to the maximum extent, maximum thrust towards the front of the craft can be provided in order to slow down and even stop the forward motion of the craft. In order to steer the craft during forward motion, it will be understood that the two units 24 would be rotated in the same direction about their vertical axis, either clockwise or counter-clockwise.

A preferred form of hovercraft 204 is illustrated in FIGS. 11-14. As mentioned earlier there are two combined propulsion and lift units 206 and 208 mounted at the rear of the craft. Each of the units 206 and 208 is rotatable about a vertical axis indicated at 210 and 212 in FIG. 12. The hovercraft 204 has a steel hull 214 having a deck located at 216 and a cabin enclosure 218. This air-cushion vehicle is equipped with the usual flexible skirt 220.

Figure 11:
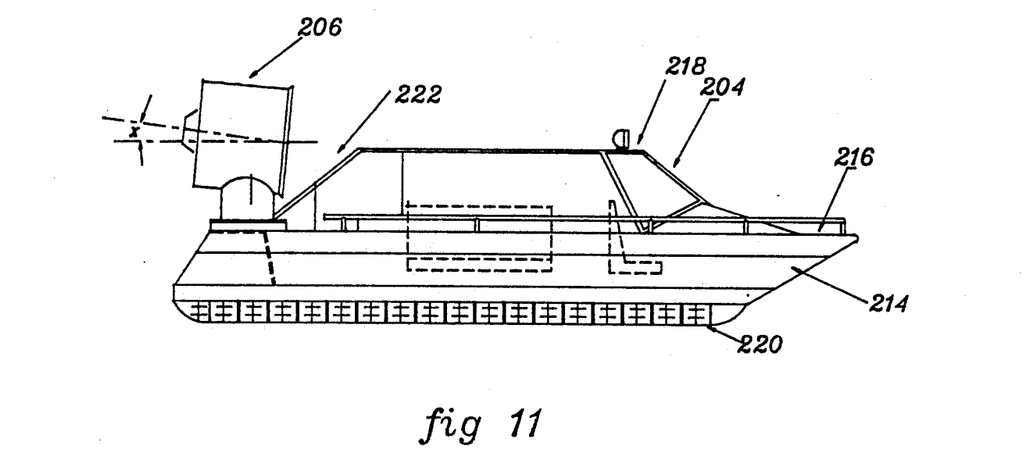
FIG. 11 is a side elevation of another version of air-cushion vehicle constructed in accordance with the invention.
Figure 12:
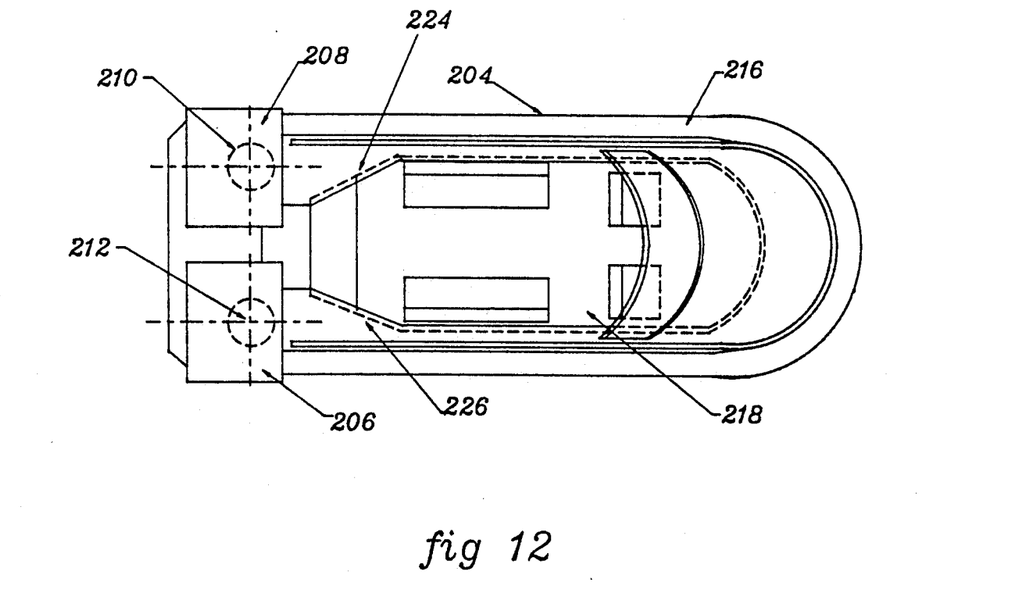
FIG. 12 is a plan view of the vehicle of FIG. 11.
Figure 13:
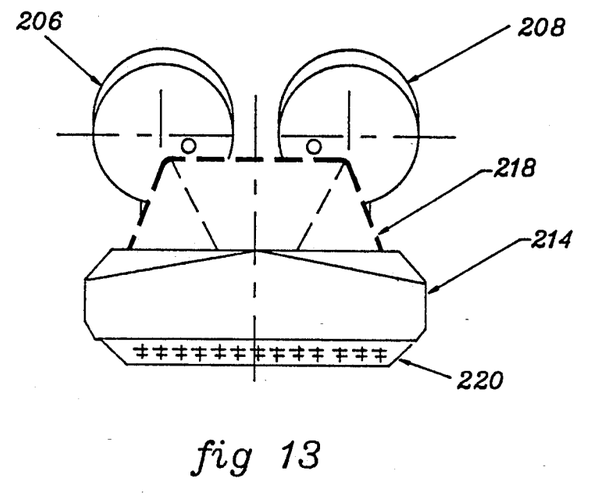
FIG. 13 is a front view of the vehicle of FIG. 11.
Figure 14:
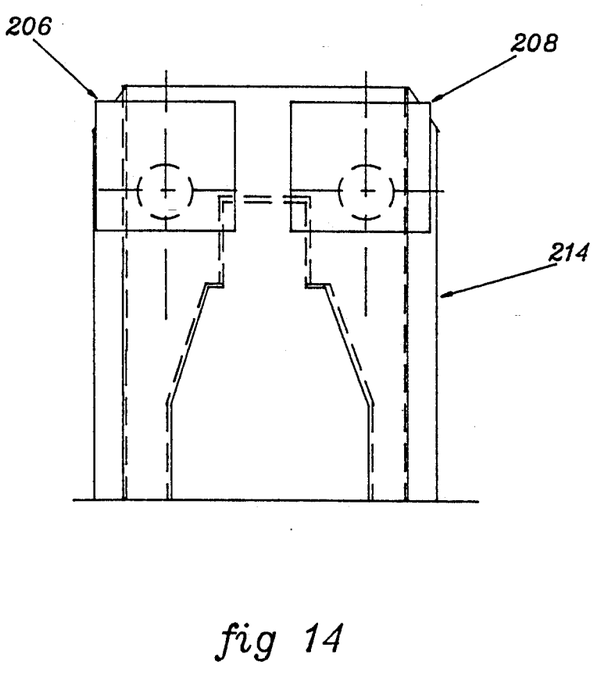
FIG. 14 is a plan view of the rear portion of the vehicle of FIG. 11 showing certain details in dash lines.

In the illustrated preferred embodiment, the rear portion of cabin enclosure 218 slopes downwardly at 222. Cabin 218 also tapers inwardly in the region in front of propulsion units 206 and 208. Thus, rear cabin walls 224 and 226 extend at an acute angle to the longitudinal axis of the craft. It will be appreciated that because of the construction of the rear portion of cabin enclosure 218, the region in front of units 206 and 208 is left relatively open and this permits the smooth flow of air into the front of these units allowing them to operate very efficiently. Preferably, as shown in FIG. 11, the centre axis or axis of rotation of each propulsion unit 206 and 208 is arranged at a slight angle X to the horizontal. This slight angle will help keep the bow of the craft down during operation of the craft at higher speeds and this in turn contributes to the efficiency of the propulsion unit. In other words the angle X of units 206 and 208 acts as a compensator against the natural tendency of the bow to lift as the speed of the craft increases.

The combined propulsion and lift units of the present invention can be operated with a small size, low horsepower motor. Thus the overall weight of the unit 24 is relatively small and this permits the unit to be secured to the craft in the region of the high pressure air discharge point, that is the outlet 54 in FIG. 7, only with the described slewing ring attachment. The unit can be rotated in either direction about the vertical axis to the extent required for either steering or stopping. This feature permits 100% of the low pressure air flow (that produced by the propeller at the rear of the unit) to be directed as required for guidance of the craft, see FIG.

2. This is a improvement over the commonly used craft guidance systems that use directional vanes for steering, a less positive method.

By engineering the design of each of the two wheels using known techniques, the optimum performance for each wheel or faction can be arrived at for a common speed. By using fan wheels at maximum efficiency, horsepower and noise levels are substantially reduced. The present construction permits 100% of the propeller fan air to be used for thrust. Therefore as air volume is directly related to speed, the same effect can be at 40% less speed than existing designs which employ propeller fans for both lift and forward motion and which generally require that approximately 40% of the air movement generated be used to lift the craft.

Moreover as horsepower is related to the cube of the speed, the horsepower reduction is about 0.06 ($0.4^3$) for the same effects. Horsepower and other efficiencies are directly related to noise levels and therefore a unit constructed in accordance with the invention can produce results superior to existing designs from this standpoint. Also small craft lift (payload) has been governed by propeller fan static pressure ability, generally limited to three inches s.w.g. (0.1 lbs per square inch or 15 lbs per square foot). The unit 24 constructed in accordance with the invention results in centrifugal fan characteristics and can therefore generate three times this pressure for the same speed thereby increasing the payload for far less power.

The materials of construction used to make the described propulsion and lift unit should be selected in order Lo provide a high Weight/strength ratio and corrosion resistance. Many of the components can be constructed using either thermoset plastic material or lightweight metal alloys. A preferred thermoset plastic for construction of the propulsion unit of the subject invention is fibreglass. Instead of using an electric motor to turn or rotate the main drive shaft, a marine engine or automotive engine can be used to provide power to the drive belts that are connected to the shaft.

Various modifications and changes can be made to the combined propulsion and lift units described herein without departing from the spirit and scope of this invention. Accordingly, all such modifications and changes as fall within the scope of the appended claims are intended to be part of this invention.

We claim:

1. A combined propulsion and lift unit for an aircushion vehicle, comprising
   a) an elongate shaft mounted for rotation about its central longitudinal axis;
   b) bearing means for rotatably supporting the shaft;
   c) an axial wheel with two or more blades mounted on the shaft for rotation therewith;
   d) a first housing extending peripherally about said shaft, the housing provided with a first air inlet and a first air outlet;
   e) means connected to the shaft for rotating same at a selected speed;
   f) a centrifugal fan wheel mounted on the shaft for rotation therewith, the fan wheel provided with an air inlet on one side and being substantially closed off at the opposite side thereof, the fan wheel located inside the housing and mounted rearwardly of said axial wheel; and
   g) a second housing extending about the perimeter of the axial wheel and the first housing, said second housing having a larger diameter than the first housing thereby defining an air passageway therebetween, said second housing provided with a second air inlet and a second air outlet;
   wherein said first air inlet is located at a rear end of said first housing away from said axial wheel.

2. A combined propulsion and lift unit according to claim 1 including means for rotating said unit about a vertical axis extending substantially perpendicular to the longitudinal axis of the shaft.

3. A combined propulsion and lift unit according to claim 1 wherein the first air inlet of the first housing is a central axial opening located on the rear end thereof.

4. A combined propulsion and lift unit according claim 3 including a plurality of fixed guide air vanes located circumferentially around the peripheral edge of said central axial opening of the first housing.

5. A combined propulsion and lift unit according to claim 4 including a covering member adjacent to and spaced from the first housing central axial opening.

6. A combined propulsion and lift unit according to claim 1 including a plurality of fixed air vanes disposed circumferentially in said air passageway for straightening air flow therethrough.

7. A combined propulsion and lift unit according to claim 1 including a plurality of pivotally mounted air vanes disposed circumferentially in said air passageway for providing a variable air outlet.

8. A combined propulsion and lift unit according to claim 1 wherein said means for rotating said shaft includes a motor, the shaft projecting from one end of the motor, the unit including an enclosure for said motor rigidly mounted to the first housing rearwardly of the fan wheel.

9. A combined propulsion and lift unit according to claim 1 wherein the means for rotating the shaft includes a continuous belt, a driven pulley mounted on the shaft, a driving pulley, and a motor connected to said driving pulley, said belt extending about said driven and drive pulleys.

10. A combined propulsion and lift unit for an aircushion vehicle, comprising
    a) an elongate shaft mounted for rotation about its central longitudinal axis;
    b) bearing means for rotatably supporting the shaft;
    c) an axial wheel with two or more blades mounted on the shaft for rotation therewith;
    d) a first housing extending peripherally about said shaft, the housing provided with a first air inlet and a first air outlet;
    e) means connected to the shaft for rotating same at a selected speed;
    f) a centrifugal fan wheel mounted on said shaft for rotation therewith and mounted rearwardly of the axial wheel, the fan wheel provided with an air inlet on one side and being substantially closed off at the opposite side thereof, the fan wheel located inside the housing with its air inlet located adjacent to a front end of said first housing which is the end closest to the axial wheel; and
    g) a second housing extending about the perimeter of the axial wheel and the first housing, said second housing having a larger diameter than the first housing thereby defining an air passageway therebetween, said second housing provided with a second air inlet and a second air outlet.

11. A combined propulsion and lift unit according to claim 10 wherein the first air inlet of the first housing is a central axial opening located on the front end thereof.

12. A combined propulsion and lift unit for an air-cushion vehicle, comprising
   a) an elongate shaft mounted for rotation about its central longitudinal axis;
   b) bearing means for rotatably supporting the shaft;
   c) an axial wheel with two or more blades mounted on the shaft for rotation therewith;
   d) a first housing extending peripherally about said shaft, the housing provided with a first air inlet and a first air outlet;
   e) means connected to the shaft for rotating same at a selected speed;
   f) a centrifugal fan wheel mounted on said shaft for rotation therewith, the fan wheel provided with an air inlet on one side and being substantially closed off at the opposite side thereof, the fan wheel located inside the housing;
   g) a second housing extending about the perimeter of the axial wheel and the first housing, said second housing having a larger diameter than the first housing thereby defining an air passageway therebetween, said second housing provided with a second air inlet and a second air outlet, and
   h) means for rotating said unit about a vertical axis extending substantially perpendicular to the longitudinal axis of the shaft, said unit rotating means including a slew ring apparatus having a stationary inner ring and an outer ring apparatus having a stationary inner ring and an outer ring rotatable relative to the inner ring, wherein the first air outlet, which is for high pressure air, extends through the inner ring.

13. A combined propulsion and lift unit according to claim 12 wherein said unit is rotatable about said vertical axis through an angle of at least 135 degrees from a normal operating position where the axial wheel has one side directed in a forwards direction and provides forward thrust.

14. A combined propulsion and lift unit according to claim 12 wherein the rotatable outer ring is provided with external gear teeth, the unit including drive means engaging the external gear teeth for rotating the outer ring and thereby said unit.

15. A combined propulsion and lift unit for an air-cushion vehicle, comprising:
   a) an elongate shaft mounted for rotation about its central longitudinal axis;
   b) bearing means for rotatably supporting said shaft;
   c) means connected to the shaft for rotating same at a selected speed;
   d) an axial wheel with two or more blades mounted on the shaft for rotation therewith;
   e) a centrifugal fan wheel capable of providing high pressure lift air mounted on one end of said shaft for rotation therewith, and
   f) a housing extending about the perimeter of said centrifugal fan having an axial inlet at the front thereof and an outlet for high pressure air arranged on one side thereof, wherein said centrifugal fan wheel is substantially closed off at a rear side thereof; and
   g) means for rotating said unit about a substantially vertical axis extending perpendicular to the central axis of the shaft, said unit rotating means including a slew ring apparatus having a stationary inner ring and an outer ring rotatable relative to the inner ring, where the outlet for the high pressure air extends through the inner ring.

16. A combined propulsion and lift unit according to claim 15 including a unit housing extending about the perimeter of the axial wheel and the fan housing, the unit housing having an air inlet for the axial wheel and an air outlet for the axial wheel.

17. A combined propulsion and lift unit according to claim 16 wherein the housing axial inlet protrudes forwardly out of the unit housing.

18. A combined propulsion and lift unit according to claim 16 wherein said means for rotating said shaft includes a motor, the shaft projecting from one end of the motor, the unit including a motor supporting enclosure rigidly mounted to the unit housing rearwardly of the fan wheel.

19. A combined propulsion and lift unit according to claim 15 wherein the means for rotating the shaft includes a continuous belt, a driven pulley mounted on the shaft, a driving pulley, and a motor connected to said driving pulley, said belt extending about said driven and drive pulleys.

20. A combined propulsion and lift system according to claim 15 including a plurality of fixed air guide vanes fixedly mounted rearwardly of said axial wheel and means for supporting outer and inner ends of said vanes.

21. A combined propulsion and lift unit according to claim 15 wherein said unit is rotatable about said vertical axis through an angle of at least 135 degrees from a normal operating position where the axial wheel has one side directed in a forwards direction and provides forward thrust.

22. A combined propulsion and lift unit according to claim 15 wherein the rotatable outer ring is provided with external gear teeth, the unit including drive means engaging the external gear teeth for rotating the outer ring and thereby said unit.

23. A combined propulsion and lift unit for an air-cushion vehicle, comprising;
   a) an elongate shaft mounted for rotation about its central longitudinal axis;
   b) bearing means for rotatably supporting the shaft;
   c) an axial wheel with two or more blades mounted on the shaft for rotation therewith;
   d) a centrifugal fan wheel mounted on the shaft for rotation therewith, the fan wheel provided with an air inlet on one side thereof and being substantially closed off at the opposite side thereof;
   e) a centrifugal fan housing, the centrifugal fan wheel located inside the centrifugal fan housing, the fan housing provided with an air inlet and an air outlet;
   f) means connected to the shaft for rotating same at a selected speed; and
   g) a second housing extending about the perimeter of the axial wheel and the centrifugal fan housing, said second housing having a larger diameter than the fan housing thereby defining an air passageway therebetween, said second housing provided with an air inlet and an air outlet, the air passageway having an opening permitting air-flow to the air inlet of the centrifugal fan housing.

24. A method of combining a propulsion and lift system for an air-cushion vehicle which is to be mounted thereon, the method comprising:
   mounting an axial thrust fan and a centrifugal lift fan on a rotatable shaft, enclosing the lift fan inside an axial fan bearing tube, wherein the bearing tube is provided with an air inlet and an air outlet, mounting the bearing tube and the thrust fan substantially inside a housing so that some of the air which is drawn into an air passageway located between the housing and the bearing tube is supplied to the centrifugal fan by the thrust fan when said shaft is rotating.

25. The method of combining a propulsion and lift system according to claim 24 wherein the amount of air supplied to the centrifugal fan by the axial wheel is varied by rotating a plurality of pivotally mounted air vanes located in the passageway.

26. The method of combining a propulsion and lift system according to claim 24 wherein the combined propulsion and lift system is rotatably mounted on the aircushion vehicle and wherein said vehicle is steered by rotating the larger housing about a substantially vertical axis.

27. A hovercraft, comprising:
a) a hull with a deck structure;
b) a skirt for enclosing an air cushion extending about said hull and connected thereto;
c) two combined propulsion and lift units rotatably mounted on a rear section of said deck structure, said units being located on opposite sides of a longitudinal centre line of the hull;
d) each of said units includes a housing having an air intake and an air outlet, an elongate shaft mounted substantially therein for rotation about its central longitudinal axis, bearing means for rotatably supporting the shaft, a bearing tube through which the shaft extends, the bearing tube provided with an air inlet and an air outlet, means connected to the shaft for rotating same at a selected speed, an axial wheel with two or more blades mounted on the shaft for rotation therewith, a centrifugal fan wheel mounted on the shaft for rotation therewith, the centrifugal fan wheel being located inside the bearing tube, provided with an air inlet on one side, and being substantially closed off at the opposite side thereof;
and wherein the unit is provided with an air passageway between the bearing tube and the housing, the air passageway having an opening permitting air-flow to the bearing tube air inlet.

28. A combined propulsion and lift unit according to claim 27 wherein said rotation means for each of said units includes a slew ring apparatus having a stationary inner ring and an outer ring rotatable relative to the inner ring, and the outlet for the high pressure air extends through the inner ring.

29. A hovercraft according to claim 28 wherein each of said units is rotatable about said vertical axis through an angle of at least 135 degrees from a normal operating position where the axial wheels each have one side directed in a forwards direction to a reverse or stopping position where each axial wheel has said one side thereof directed in a rearwards direction and out to one side of the hovercraft.

30. A hovercraft, comprising:
a) a hull with a deck structure;
b) a skirt for enclosing an air cushion extending about said hull and connected thereto;
c) two combined propulsion and lift units rotatably mounted on a rear section of said deck structure, said units being located on opposite sides of a longitudinal centre line of the hull;
d) each of said units includes a housing having an air intake and an air outlet, an elongate shaft mounted substantially within the housing for rotation about its central longitudinal axis, bearing means for rotatably supporting the shaft, means connected to the shaft for rotating same at a selected speed, an axial wheel with two or more blades mounted on the shaft for rotation therewith, a centrifugal fan wheel mounted on the shaft for rotation therewith, a centrifugal fan tube is provided in which the centrifugal fan wheel is located, the centrifugal fan tube provided with an air inlet and an air outlet arranged on one side thereof;
and wherein said fan wheel is provided with an air inlet on one side thereof and is substantially closed off at the opposite side thereof and wherein the unit is provided with an air passageway between the centrifugal fan tube and the housing, the air passageway having an opening permitting air-flow to the air inlet of the fan tube.

31. A combined propulsion and lift unit according to claim 30 wherein said rotation means for each of said units includes a slew ring apparatus having a stationary inner ring and an outer ring rotatable relative to the inner ring, and the outlet for the high pressure air extends through the inner ring.

32. A hovercraft according to claim 31 wherein each of said units is rotatable about said vertical axis through an angle of at least 135 degrees from a normal operating position where the axial wheels each have one side directed in a forwards direction to a reverse or stopping position where each axial wheel has said one side thereof directed in a rearwards direction and out to one side of the hovercraft.

* * * * *